Sept. 30, 1969     E. GAUDRY     3,469,470

NOISE REDUCTION OF GEAR TRAIN

Filed Oct. 24, 1967

INVENTOR.
EDOUARD GAUDRY

BY Thomas C. Bitts
William S. Henry

HIS ATTORNEYS

United States Patent Office 3,469,470
Patented Sept. 30, 1969

3,469,470
NOISE REDUCTION OF GEAR TRAIN
Edouard Gaudry, St. Laurent, Quebec, Canada, assignor to Electrolux Corporation, Old Greenwich, Conn., a corporation of Delaware
Filed Oct. 24, 1967, Ser. No. 677,662
Int. Cl. F16h 55/14, 55/12; A63d 5/10
U.S. Cl. 74—443
3 Claims

ABSTRACT OF THE DISCLOSURE

A gear train for a floor polisher or the like apparatus having a steel pinion gear meshed with a nylon gear wheel which is in turn meshed with a pair of "Texin" gear wheels. The gear wheels each have an aluminum insert carrying a molded tire having peripheral gear teeth. One gear tire is constituted of nylon and the remaining pair of molded tires are constituted of "Texin 355D" material (a urethane elastomer resin produced by Mobay Chemical Co.). In addition the nylon gear tire is "normalized" by immersion in water at 160° F. for four hours.

Background of the invention

It is known to replace metal gears with gears constituted of synthetic resin material, such as nylon, acetate, polycarbonate, or phenolic thermoplastic resins for noise reduction. However, it is not believed to be known to utilize different synthetic resin gears for a further noise reduction over that obtained by gear wheels which are all of the same resin material.

Summary of the invention

This invention relates to a gear train including a plurality of meshed gears each of which has an aluminum insert and a molded resin tire thereon having the gear teeth. In operation noise produced by the meshed gears is materially reduced by selecting different resins for the meshed gears. In the presently preferred arrangement one of the gears is constituted of "normalized nylon" and the gear wheels meshed therewith are provided with tires constituted of "Texin," a urethane elastomer thermosetting resin.

An object of the invention therefore is to provide a gear train having a plurality of meshed gear wheels of different resin material for achieving noise reduction of the gear train.

Another object of the invention is to provide a gear train having a plurality of gear wheels in which the drive gear consists of a thermoplastic resin meshed with driven gears of thermosetting resin material for reducing gear train noise.

The foregoing objects and advantages will be apparent from the following description of the attached drawing showing a presently preferred embodiment of the invention.

Description of preferred embodiment

Figure 1:
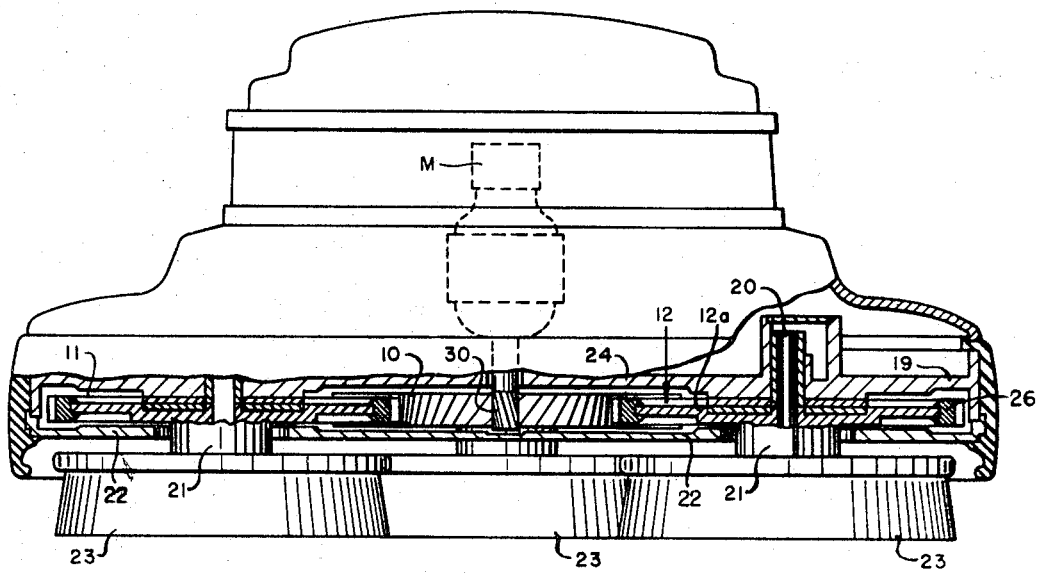
FIG. 1 is a side elevational view, partly broken away and in section, illustrating a gear train according to the invention within the base portion of a floor polisher.
Figure 2:
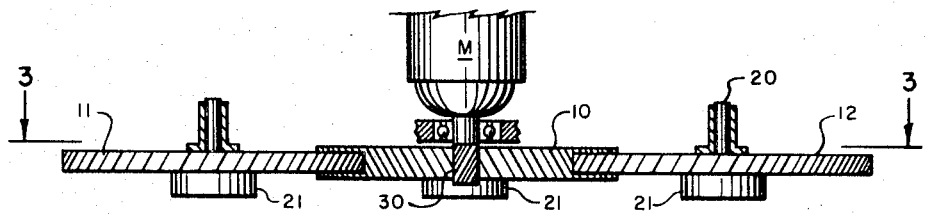
FIG. 2 is a schematic elevational view of the gear train per se according to FIG. 1.
Figure 3:
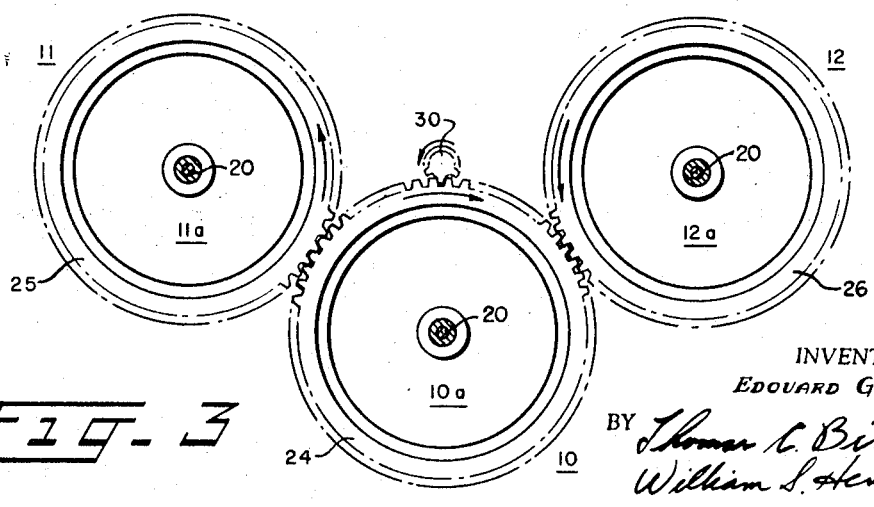
FIG. 3 is a plan view taken on line 3—3 of FIG. 2.

FIG. 1 illustrates a three brush floor polisher having a gear train according to the invention which is best shown in FIGS. 2 and 3. Each of the gear wheels 10, 11 and 12 are supported on a base plate 19 in known manner and each comprises an aluminum insert 10a, 11a and 12a respectively rotatably mounted in any suitable manner on journaled shafts 20. Integral with each of the gear inserts 10a, 11a and 12a is a brush spindle 21, each of which projects through a suitable opening in a splash plate 22. Each of the spindles 21 receive a brush 23 which is removably connected onto its associated driving spindle as disclosed in copending application Ser. No. 647,378 (FIGS. 23 to 26).

The gear inserts 10a, 11a and 12a are each provided with tires 24, 25 and 26 which are preferably molded directly onto the periphery of the inserts and have gear teeth formed in their circumferential surface. Each tire 24, 25 and 26 is meshed with the adjacent tire as shown schematically in FIG. 3. The triangle generally defined by the meshed gears 10, 11 and 12 has an apex gear wheel 10 which is meshed with a driving pinion gear 30 on the shaft of motor M.

In accordance with this invention the tire 24 of apex gear 10 is constituted of a nylon resin material and the tires 25, 26 of the gear wheels 11 and 12 is constituted of "Texin 355D."

A material reduction in the operating noise level of meshed gears 10, 11 and 12 is obtained by the selection of nylon for gear tire 24 and "Texin" for gear tires 25 and 26.

A further reduction in the operating noise level of these gears is obtained by normalizing the nylon tire 24. That is, the gear wheel 10 is immersed in water at 160° F. for approximately four hours before it is placed in the gear train.

It will be apparent to those skilled in the art that in place of nylon other suitable resins may be used; for example, TFE filled acetate, polycarbonatees, and fabric filled phenolics. "Texin," a urethane elastomer, may also be replaced with other elastomers having similar properties i.e.

Hardness, Shore _____ 50A–70D
Specific gravity _____ 1.1–1.3
Tensile strength (p.s.i.) _____ 4000–8000
Ultimate elongation (percent) _____ 400–700
Resilience (percent) _____ 50–80
Compression set (158° F.; percent) _____ 0–50
Tear Strength (split sample method; lb./in.) ____ 50–400
Flexural modulus (p.s.i.) _____ 8000–90,000
Compression deflection (at 5%; p.s.i.) _____ 100–800

What is claimed is:
1. A gear train comprising a first gear having an aluminum insert and a gear tire connected peripherally the reof, said gear tire being constituted of normalized nylon resin, a second gear comprising an aluminum insert having a second gear tire connected peripherally thereof, said second gear tire being constituted of a urethane elastomer material.
2. A gear train according to claim 1 for a floor care machine wherein each said gear insert includes an axially extending spindle member for receiving a brush means of said floor care machine.
3. A gear train according to claim 2 with the addition of a motor having a normally vertically extending shaft, a pinion gear at one end of said shaft meshed with said first gear.

References Cited
UNITED STATES PATENTS

| | | | |
|---|---|---|---|
| 2,699,656 | 1/1955 | Anderson et al. | 74—434 X |
| 2,785,424 | 3/1957 | McMaster et al. | 74—421 X |
| 3,272,027 | 9/1966 | Wayman | 74—434 X |
| 3,304,795 | 2/1967 | Rouveral | 74—446 X |

LEONARD H. GERIN, Primary Examiner

U.S. Cl. X.R.
15—28, 52; 74—446